United States Patent [19]

Jacques et al.

[11] Patent Number: 4,734,205

[45] Date of Patent: Mar. 29, 1988

[54] HYDROPHOBICALLY ASSOCIATING POLYMERS FOR OILY WATER CLEAN-UP

[75] Inventors: Donald F. Jacques, Belle Mead; Jan Bock, Bridgewater, both of N.J.

[73] Assignee: Exxon Research and Engineering Company, Florham Park, N.J.

[21] Appl. No.: 905,073

[22] Filed: Sep. 8, 1986

[51] Int. Cl.$^4$ .................................. C02F 1/56
[52] U.S. Cl. .................................. 210/708; 210/727; 210/734; 252/341; 252/344; 252/358
[58] Field of Search ............... 210/708, 725, 727, 728, 210/732–735; 252/329, 340, 341, 344, 358

[56] References Cited

U.S. PATENT DOCUMENTS

| | | | |
|---|---|---|---|
| 3,147,218 | 9/1964 | Booth et al. | 210/734 |
| 3,691,086 | 9/1972 | Lees et al. | 252/341 |
| 3,716,483 | 2/1973 | Renner | 210/693 |
| 3,956,117 | 5/1976 | Bradley et al. | 210/708 |
| 4,026,794 | 5/1977 | Mauceri | 252/344 |
| 4,081,403 | 3/1978 | Takegami et al. | 210/192 |
| 4,160,742 | 7/1979 | Raman | 252/344 |
| 4,224,150 | 9/1980 | Buriks et al. | 210/735 |
| 4,304,902 | 12/1981 | Landoll | 528/419 |
| 4,343,730 | 8/1982 | Becker et al. | 210/734 |
| 4,395,524 | 7/1983 | Emmons et al. | 524/555 |
| 4,432,881 | 2/1984 | Evani | 524/375 |
| 4,472,284 | 9/1984 | Bolhofner | 210/708 |
| 4,520,182 | 5/1985 | Turner et al. | 526/307.2 |
| 4,528,348 | 7/1985 | Turner et al. | 526/303.1 |
| 4,529,782 | 7/1985 | Fan et al. | 526/259 |
| 4,588,508 | 5/1986 | Allenson et al. | 210/708 |

*Primary Examiner*—Peter Hruskoci
*Attorney, Agent, or Firm*—Richard E. Nanfeldt

[57] ABSTRACT

The present invention teaches an improved process for clean-up of waste waters containing organic contaminants. In addition, the process is useful for breaking or resolving oil-in-water emulsions, such as those produced during oil recovery operations. Both the extent of clean-up based on residual oil left in the waste water and the efficiency of clean-up based on the treat rate of additive have been found to be significantly improved using the novel process of this invention. The novel process involves the use of a low level of a water dispersible terpolymer consisting of acrylamide, acrylic acid or its salts, and alkylacrylamide or alkylacrylate or alkylmethacrylate; or copolymers consisting of acrylamide and alkylacrylamide or alkylacrylate or alkylmethacrylate alone or in combination with a cationic species used to control the charge, usually negative charge reduction to near neutral, of the oil or organic contamination droplets in the emulsion being treated. The process of this invention is effective for the clean-up of waste waters containing organic contaminants and for the breaking of oil-in-water produced emulsions.

2 Claims, No Drawings

HYDROPHOBICALLY ASSOCIATING POLYMERS FOR OILY WATER CLEAN-UP

BACKGROUND OF THE INVENTION

1. Field of the Invention

The present invention teaches an improved process for clean-up of waste waters containing organic contaminants. In addition, the process is useful for breaking or resolving oil-in-water emulsions, such as those produced during oil recovery operations. Both the extent of clean-up based on residual oil left in the waste water and the efficiency of clean-up based on the treat rate of additive have been found to be significantly improved using the novel process of this invention. The novel process involves the use of a low level of a water dispersible terpolymer consisting of (meth)acrylamideacrylic acid or its salts, and (meth)alkylacrylamide or alkyl(meth)acrylate, or copolymers consisting of acrylamide-alkyl(meth)acrylamide or alkyl(meth)acrylate, alone or in combination with a cationic species used to control the charge, usually negative charge reduction to near neutral, of the oil or organic contaminant droplets in the emulsion being treated. These polymers are effective for the clean-up of waste waters containing organic contaminants and for breaking of oil-in-water produced emulsions.

2. Description of the Prior Art

The production of waste water clean enough for safe disposal continues to be a problem, especially when oil is emulsified in the primary waste water. In oil production, especially where high levels of water flooding or steam flooding are being practiced, oil-in-water emulsions are generated. These water continuous emulsions are generally referred to as reverse emulsions since the more common oil field-produced fluid is a water-in-oil emulsion. Reverse emulsions are difficult to break and generally result in large volumes of oil contaminated waste water. This must be treated for removal of oil and solids before disposal by either release to surface streams, injection or use as boiler water make-up for steam generation. Other oil-in-water emulsions of concern in the waste water treating area are those produced as a result of steel mill and metal working operations, food processing, refinery and chemical plant operation, cooling water blow-down, bitumen extraction from tar sands and shale oil operations, rain water run-off and a host of others. These emulsions all have in common the fact that the oil or organic phase is insoluble in the water continuous phase. The amount of oil dispersed in these water continuous emulsions varies from a few to several hundred parts per million in waste waters to several percent (5 to 25% or more) in fluids right out of the wellhead.

The oil is generally well dispersed in the water phase as very small droplets that are stabilized as a result of the presence of natural surfactants. The stability of these oil-in-water emulsions generally results from either a positive or negative charge imparted to the droplets by these surfactants or from steric stabilization caused by surfactants or by the shear which the fluid experiences during production, which causes the generation of smaller and more stable droplets, or from several other sources. As the density of the organic phase becomes higher, approaching that of the water phase, further stability is imparted to the emulsion. The presence of fine solids, such as clays, sands, corrosion products, etc. in the fluids adds to the stability of these oil-in-water emulsions. The stability of these oil-in-water emulsions must be overcome if the oil is to be removed from the water before disposal or in order to separate the oil from the water in the produced fluids in the case of oil production in water floods and steam floods.

Current practice is to attempt to break waste water and other oil-in-water emulsions using various mechanical techniques, such as API separators, induced air flotation (IAF), dissolved air flotation (DAF), or other methods. In the API separator method time is allowed for the oil droplets to come together and float to the surface or to settle to the bottom if adsorbed onto suspended solids. In many cases just a large tank is used to provide a long holding time for the fluid under essentially low flow or quiescent conditions. The expectation is that the long residence time will permit coalescence and settling of the oil droplets. In the flotation methods, air or another gas, such as natural gas or produced gases in the oil field where the waste water is generated, is used to form very small gas bubbles under the surface of the waste water. As the gas bubbles rise to the surface the oil droplets attach themselves and rise to the surface with them, concentrating at the surface where the oil can be removed.

Various chemicals, surfactants and polymers are generally applied to these waters to enhance the separation of oil and water using the above methods and, in some cases, are required if the method is to work at all. These chemicals are used to aid in foam generation in flotation. In addition they may be used to cause oil droplet surface charge neutralization, which results in destabilization of the oil-in-water emulsion. This destabilization results in agglomeration of the oil droplets, floc formation and, possibly, several other beneficial effects. The type of water soluble polymers currently used are generally acrylamide copolymers or melamine/formaldehyde polymers or other. For example, Bolhofner in U.S. Pat. No. 4,472,284 describes the treatment of water containing fats, oils and greases using a melamine-formaldehyde condensation product, alone or in combination with a polyacrylamide. Cationic epichlorohydrins have also been used in combination with polyacrylamides. While the use of such chemicals generally enhances the separation of oil from oil-in-water emulsions, there remains significant room for improvement.

Another approach to the treatment of waste water involves the use of water insoluble polymeric adsorbents, as described by Renner in U.S. Pat. No. 3,716,483, or Takegani, et al. in U.S. Pat. No. 4,081,403. These processes for treating waste water are costly and cannot achieve the degree of clean-up of the present invention. Copolymers of acrylamide with various cationic monomers of various comonomer compositions have been used. Some of the cationic monomers that have been used are: methylacrylamidoalkyltrimethylammonium salts or similar acrylate esters, diallyl dialkyl ammonium salts, as described by Booth, et al. in U.S. Pat. No. 3,147,218, salts of dimethylaminoethylmethacrylate and the like. Buris, et al., U.S. Pat. No. 4,224,150, describe a process for clarifying aqueous systems employing quaternary ammonium adducts of polymerizable tertiary ammonium salts and acrylamide. These polymers are generally available as high molecular weight materials, either in aqueous solution, as emulsions of various types, or in solid form which requires dissolution before use. These polymers and processes generally require relatively large amounts of additive to effect resolution of oil-in-water emulsions or do not provide sufficient separation of the oil from the water.

Typically, treatment polymers are mixed into the waste water using various levels of shear. The water is then allowed to stand in a quiescent state for several hours or days until the oil flocculates and floats to the surface, where it is skimmed off. The water phase containing any residual oil is removed from beneath the surface and is either further treated, re-used or is disposed of. As an alternative to the above quiescent aging method, the polymer-treated water can be sent to a gas flotation device for oil removal as described above.

Reverse emulsions produced at the wellhead in steam floods or water floods are generally treated with surfactants and polymers in a similar way. However, flotation equipment is not generally used on the wellhead fluid, but is used on the water, which we have called waste water, broken out of the produced emulsion. A more typical practice would be the use of settling tanks, which hold the produced fluid in a quiescent state at elevated temperature for a period of time. This equipment may vary from a simple tank to devices which add heat and make use of electrical fields to accelerate the breaking of emulsions.

Improved methods for resolving oil-in-water emulsions, such as those produced at the wellhead, would find significant utility and environmental benefit. For example, if the level of residual oil remaining in the treated water could be reduced or the speed of oil removal increased, then a more economical treating operation would result. These improvements in treating method would provide both an economic and environmental benefit. The present invention describes an improved process for treating oil-in-water emulsions.

A new class of water soluble polymers containing a relatively small amount of oil soluble or hydrophobic groups have been described in several recent patents, but their use in the clean-up of oily waste water or for resolving oil-in-water emulsions was not mentioned. For example, Bock, et al., U.S. Pat. No. 4,520,182, described copolymer compositions of water soluble, non-ionic monomers, such as acrylamide, and a minor amount of an oil soluble higher alkylacrylamide, such as octylacrylamide. The hydrophobically associating polymer compositions disclosed in this patent are incorporated herein by reference. These water soluble acrylamide copolymers contained a small amount of oil soluble or hydrophobic alkylacrylamide groups and were found to impart efficient viscosification to aqueous fluids, however, their use in oily water treatment was not disclosed. Landoll, U.S. Pat. No. 4,304,902, described copolymers of ethylene oxide with long chain epoxides for thickening water. In a related case, U.S. Pat. No. 4,428,277, modified nonionic cellulose ether polymers were described. The use of surfactants to provide aqueous solubility and, in turn, viscosification by a water soluble polymer containing hydrophobic groups was described in Evani, U.S. Pat. No. 4,432,881. Emmons, et al., U.S. Pat. No. 4,395,524, teaches acrylamide copolymers as thickeners for aqueous systems. While these polymers possess hydrophobic groups, they were prepared using alcohol-containing solvents, which are known chain transfer agents. The resulting polymers have rather low molecular weights and, thus, relatively high polymer concentrations are required to achieve reasonable viscosification of water based fluids. While compositions of water soluble polymers containing a minor amount of oil soluble or hydrophobic groups have been used at relatively high concentrations (i.e., greater than about 1,000 ppm) for aqueous thickening, their use at low concentrations (i.e., less than about 200 ppm) for resolving oil-in-water emulsions has not as yet been disclosed. Compositions of the water soluble polymers containing a minor amount of oil soluble or hydrophobic groups disclosed in the aforementioned patents are incorporated herein by reference.

One of the objects of this invention is to overcome the deficiencies in the use of the water soluble polymers of the prior art for treating oil-in-water emulsions. Another object is to provide separated water with improved clarity and reduced oil and contaminant content. A further object of this invention is to provide improved oily water clean-up using a reduced amount of additives to provide a more economical process.

SUMMARY OF THE INVENTION

The present invention teaches an improved process for clean-up of waste waters containing organic contaminants. In addition, the process is useful for breaking or resolving oil-in-water emulsions, such as those encountered during oil recovery operations. Both the extent of clean-up, based on residual oil left in the waste water, and the efficiency of clean-up, based on the treat rate of additive, have been found to be significantly improved using the novel process of this invention. The novel process involves the use of a low level of a water dispersible terpolymer consisting of (meth)acrylamide, (meth)acrylic acid or its salts, and alkyl(meth)acrylamide or alkyl(meth)acrylate; or copolymers consisting of (meth)acrylamide and alkyl(meth)acrylamide or or alkyl(meth)acrylate, alone or in combination with a cationic species used to control the charge, usually negative charge reduction to near neutral, of the oil or organic contaminant droplets in the emulsion being treated. The process of this invention is effective for the clean-up of waste waters containing organic contaminants and for the breaking of oil-in-water produced emulsions.

DETAILED DESCRIPTION OF THE INVENTION

The process of this invention for treating oily water or oil-in-water emulsions involves several sequential steps:

(a) first adding, under suitable agitation conditions, a cationic polymer or additive capable of neutralizing the surface charge on the oil droplets or converting and controlling the charge to a slightly positive value;

(b) next adding, under suitable agitation conditions, an effective amount of hydrophobically functionalized water soluble polymer;

(c) finally, after contacting under suitable agitation conditions for a prescribed time, allowing the emulsified oil droplets or contaminants to separate under quiescent conditions into a distinct layer from the water and removing said layer.

An alternative to this step is the use of gas flotation to accelerate the oil removal process. To accelerate the separation, a centrifuge or cyclone could also be employed. In either case, it is important to perform the first two steps sequentially for effective oily water clean-up.

The first step of the process of this invention involves the use of cationic polymers or additives to neutralize or convert the anionic charge found on oil droplets and contaminants in many waste waters. Typical cationic polymers, such as melamine-formaldehyde polymers, epipolyamine adduct af amine and epichlorohydrin, either as homopolymers or as copolymers with (meth)acrylamide, methacrylamidoalkyltrimethyl ammonium salts or similar (meth)acrylate esters, either as homopolymers or copolymers with (meth)acrylamide, diallyl dialkyl ammonium salts, either as homopolymers or copolymers with (meth)acrylamide, and polyethylene imines.

In general, cationic polymers or cationic additives are used at a level sufficient to neutralize the charge on the oil droplets or contaminants. A slight excess of cationic could be used to assure complete anionic charge conversion and perhaps provide a low level of residual cationic charge. However, using too much cationic polymer would result in oil droplets which are again charge stabilized, but this time with a cationic instead of an anionic charge. The desired final state of the oil droplets is one of neutral to slightly cationic surface charge to allow a somewhat wider treatment concentration with the polymer of the second step of this process.

The hydrophobically functionalized water soluble copolymers and terpolymers found useful as the additive in the second step of the instant invention consist of (meth)acrylamide and alkyl(meth)acrylamide or alkyl(meth)acrylate, referred to as hydrophobic monomers, either alone or with acrylic acid or salts of acrylic acid. The alkyl(meth)acrylamide or alkyl(meth)acrylate have limited solubility in water and appear to interact very strongly with the oil droplets in waste water. The chain length on the alkyl portion of these hydrophobic monomers is related to their insolubility and the efficiency of their use for oily water clean-up. Carbon chain lengths from 4 to 22, more preferably from 6 to 20, and most preferably from 6 to 18 can be used.

The amount of hydrophobic group in the polymers used in the process of this invention is preferably between 0.01 mole percent and 10 mole percent, more preferably between 0.1 mole percent and 10 mole percent, and most preferably between 0.2 mole percent and 5 mole percent. As the chain length of the hydrophobic group increases, effective amount of hydrophobic group in the polymer useful for oily water treatment decreases. Thus, while an octylacrylamide might function at about 1.0 mole percent, a dodecylacrylamide could function at about 0.50 mole percent.

Terpolymers of acrylamide, hydrophobic monomers and salts of acrylic acid can also be used in the process of this invention. The amount of acrylic acid salts in the terpolymers is preferably from 0.01 to 50 mole percent, more preferably from 1.0 to 40 mole percent, and most preferably from 5 to 40 mole percent. The presence of charged groups on the polymer, such as carboxylic acid or salts of carboxylic acids, raises the hydrophobe content requirement. For example, if a terpolymer containing about 20 mole percent sodium acrylate is used, then the hydrophobe content should be increased from about 1.0 mole percent octylacrylamide to about 1.5 mole percent octylacrylamide. In general, the amount of hydrophobe is increased based on the charge content and molecular weight of the polymer until the solubility is decreased, enabling rapid interaction with suspended oil droplets in waste water. It is possible to have too much hydrophobic groups, which would reduce the polymer solubility to such an extent that the polymer would collapse on itself and reduce its effectiveness in the process of this invention.

The process used to prepare the hydrophobic functionalized copolymers and terpolymers used in this invention are described in Bock, et al., U.S. Pat. No. 4,528,348 and U.S. Ser. No. 801,226 filed Nov. 25, 1985. A micellar polymerization process is used in which the water insoluble hydrophobic monomer is dispersed by surfactant micelles in an aqueous solution containing the water soluble monomers. The surfactant concentration is such that only a few hydrophobic monomers at most are contained within each micelle. A distinguishing feature is that the solution is completely transparent during the entire polymerization. Free radical or redox initiation systems are used to initiate polymerization and synthesis conditions, such as temperature, initiator level and monomer concentration, are adjusted to provide a polymer with the desired molecular weight. Additionally, one could use acrylic acid or salts of acrylic acid during the polymerization to introduce ionic groups or by post-hydrolyzing the copolymer. The molecular weight of the hydrophobically functionalized polymer should preferably be between 200,000 and 10,000,000, more preferably between 400,000 and 8,000,000, and most preferably between 500,000 and 5,000,000. While the method just described is the preferred method of preparing these polymers, other methods known in the art could be used, as long as the resulting copolymers had the characteristics as described previously.

The advantage of the polymers disclosed over polymers currently used is the discovery that the presence of hydrophobic groups on the water soluble polymer during a water treating operation results in a significant improvement in the performance, e.g., the breaking of reverse emulsions (e.g., from a well head) and the removal of emulsified or dispersed oil from waste waters. By way of example, oil droplets emulsified in water generally carry a negative surface charge or zeta potential, which helps to stabilize the emulsion, keeping the droplets dispersed and making them difficult to resolve or break. Cationic polymers or surfactants are used to neutralize the surface charge. Once the charge is near neutrality the droplets may begin to approach each other and agglomerate or coalesce since the electrostatic repulsion responsible for a significant portion of the emulsion's stability has been eliminated. Eventually large floc formation or liquid oil formation occurs. Once the droplets begin to flocculate, they can begin to float since they are much larger than the starting oil droplets. As they grow in size, they will rise to the surface of the water at a faster rate. If a high molecular weight cationic polymer is used for charge neutralization, the polymer will accelerate the separation of the oil. The conventional polymers are attracted to the oil droplets by coulombic forces, hydrogen bonding or other mechanisms. In some cases low molecular weight cationic chemicals are added for charge control and then high molecular weight nonionic or anionic polymers are added next to cause polymer bridging between droplets and accelerate floc formation.

The advantage of the disclosed polymers is related to the fact that they are water soluble but also contain small amounts of hydrophobic groups. Not wishing to be bound by theory, we believe that while conventional polymers can only attach themselves to oil droplets by coulombic attraction, hydrogen bonding and other mechanisms, the hydrophobic groups of these novel copolymers and terpolymers can also be attached by a hydrophobic group - hydrophobic oil droplet association. While coulombic attraction still appears to be the strongest type of attraction, the hydrophobic association, or hydrophobic effect, appears to add a significant strengthening to this attraction, as evidenced by improved emulsion breaking and waste water clean-up. Indications are that the hydrophobic functionalized polymers of this invention enable the formation of very strong floc particles. This is based on the observation that, unlike many conventional treatments, the floc particles produced by the water treatment process of this invention are very difficult to redisperse with agitation once they are formed. Adsorption of the hydrophobic functionalized water soluble polymer on the surface of the oil droplets is believed to be the cause of this observation.

The process for the removal of the emulsified oil from the water disclosed here comprises adding under suitable agitation conditions about 0.1 to about 200 ppm of the hydrophobically functionalized water soluble polymer to the waste water containing the emulsified oil droplets. Prior to this a cationic polymer or additive, capable of oil droplet surface charge neutralization and control to a point in the positive range, has already been added. After contacting under suitable agitation conditions for a prescribed time period, the emulsified oil droplets and polymer separate under quiescent conditions into a distinct layer from the water. The disclosed polymers are added to the mixture of water and emulsified oil droplets at a concentration of about 0.1 to about 200 ppm, depending on the amount of oil present and several other factors. The rate of mixing after polymer addition depends on the type of water being treated, the amount of oil emulsified in the water, temperature and several other conditions not generally under the control of the person applying the treatment. The concentration of oil remaining in the water after treatment with the disclosed polymers is significantly less than the concentration of oil remaining in the water after similar treatment with a similar polymer not containing the novel hydrophobe functionalization. The oil layer which has separated as a distinct layer from the layer of water can be separated from the water by conventional methods.

This disclosure describes a process to break oily water emulsions and oil field-produced fluids, commonly referred to as reverse emulsions. While it is difficult to exactly simulate these emulsions in the laboratory, it is common practice to make laboratory emulsions using crude oil from an oil production field of interest by high shear mixing the given crude into water using a Waring blender or homogenizer. The formed oil-in-water emulsion can then be diluted with water and other suitable materials to simulate the oil production field being studied. The emulsions thus produced simulate oily waste waters from a given area but are recognized as being an approximation. One would typically use these laboratory emulsions for testing chemical additives in the laboratory prior to confirmatory testing on the actual system in the field. While this method appears suitable for the testing of oily waste waters, the testing of chemical additives as oil field-produced fluid reverse emulsion breakers in the laboratory is next to impossible and generally requires that such test work be carried out in the field. Concentrated oil-in-water emulsions prepared in the laboratory are not stable and do not suitably simulate wellhead-produced fluids.

A common laboratory test used to simulate a mild water clarification process in the field is what is referred to as the Jar Test. The Jar Test involves putting 500 ml of a laboratory-prepared or actual field emulsion into 600 ml clear glass beakers (six at a time). Larger beakers may be used if enough fluid is available. The beakers are then placed on a six-paddle Phipps & Bird stirrer and mixed at a high rate, referred to as the fast mix period. Polymer is added at this mixing speed and timing is begun. After a specified amount of time at high speed the mixing rate is reduced to a much slower rate for another specified amount of time. The beakers are removed from the mixer and allowed to stand for another period of time. Samples of solution are taken from a point near the 250 ml mark on the beakers and tested for turbidity (NTU), using standard test equipment and oil-in-water content, using one of several available methods. An example of one of the oil-in-water determinations is to Freon-extract the oil from waste water and then measure its infrared adsorbance relative to a standard. The object of the test is to achieve the lowest NTU or oil level using the smallest amount of polymer. The actual mixing rates and times used in the Jar Test depend on the system being simulated and vary from study to study. The Jar Test, from the experience of many investigators over the years, has been shown to provide a good simulation of field clarification systems.

DESCRIPTION OF THE PREFERRED EMBODIMENTS

The following Examples illustrate the present invention without, however, limiting the same hereto.

EXAMPLE 1

Micellar Polymerization

In a 5 liter glass reactor equipped with stainless steel baffels, turbine impellers and nitrogen sparge, 75.0 g of acrylamide (AM), 80 g of sodium dodecyl sulfate (SDS), 2.0 g (1.0 mole percent) of N-n-octylacrylamide (R) and 2,425 g of distilled water were mixed to form a homogeneous, transparent solution. The reaction fluid was deoxygenated by sparging with nitrogen ($N_2$) for 2 hours while heating to bring the temperature up to 50° C. At temperature the initiator, 0.05 g of potassium persulfate ($K_2S_2O_8$) in 10 ml of deoxygenated water, was added. The reaction was maintained at 50° C. with gentle agitation for 18 hours. Part of the polymerized solution was then isolated to provide a RAM copolymer of octylacrylamide (R) and acrylamide (AM). While maintaining the remaining reaction solution at a temperature of 50° C., 200 ml of 50% sodium hydroxide (NaOH) or 0.40 moles of NaOH was added and allowed to react for 1 hour. The resulting terpolymer was isolated by precipitating in 2 volumes of methanol. The swollen polymer mass was ground in a Waring blender, washed with methanol and vacuum oven dried at 40° C. for 16 hours. This HRAM polymer, consisting of acrylamide, octylacrylamide and sodium salt of acrylic acid, was a white, friable material with 3 weight percent moisture as determined by weight loss following 24 hours of vacuum drying at 110° C. Nitrogen and sodium analysis, along with potentiometric titration, showed that the polymer contained 18.4 mole percent sodium acrylate groups.

EXAMPLE 2

Synthetic Emulsion Preparation

Cody crude oil (10 g) with the free water removed was emulsified into 495 g of distilled water containing 100 ppm of an anionic surfactant using a Waring blender or a homogenizer. The concentrated emulsion was permitted to sit overnight (approximately 18 hours) in a separatory funnel and then the bottom layer was diluted (25 g of emulsion per liter of distilled water) and salinity adjusted to 600 ppm NaCl. This resulted in a test emulsion with the following typical properties:
Turbidity: 270 to 280 NTU
Oil Content: 420 to 450 mg/l pH: 8.0 (adjusted)

Usually a large volume of this test emulsion (15 liters) is prepared and any unused portion is discarded at the end of the day. The emulsion concentrate can be prepared several days ahead of time as long as it is removed from the separatory funnel after the prescribed aging time.

EXAMPLE 3
Oily Water Treating with Conventional Polymers

The test emulsion prepared in Example 2 is separated into 500 ml samples, as needed, in 600 ml clear glass beakers (six at a time) and placed on a six paddle Phipps & Bird stirrer and mixed at approximately 150 to 160 rpm. Polymer is added at this mixing speed and timing is begun. After 30 minutes at high speed, the mixing rate is reduced to 10 rpm for 15 minutes and then the beakers are removed from the mixer and allowed to stand for 60 minutes. Samples of solution are removed from a point near the 250 ml mark on the beakers and tested for turbidity (NTU) and oil-in-water content. The object of the test is to achieve the lowest NTU or oil level using the smallest amount of polymer.

A typical set of test results, which demonstrates the performance of conventional water soluble polymers using a laboratory-simulated waste water emulsion Jar Test, are shown below.

| | Starting Oil Level = 465 ppm, 275 NTU | | |
|---|---|---|---|
| | | After Treatment | |
| Polymer | ppm Active Polymer | Turbidity NTU | Oil ppm |
| A | 0.25 | 260 | 464 |
| | 0.38 | 115 | 430 |
| | 0.5 | 180 | 450 |
| | 0.75 | 240 | 445 |
| | 1.0 | 260 | 462 |
| B | 0.3 | 275 | 249 |
| | 0.6 | 140 | 167 |
| | 0.9 | 32 | 273 |
| | 1.2 | 50 | 375 |
| | 1.5 | 80 | 415 |
| | 1.8 | 100 | 421 |

Polymers:
A - Epipolyamine adduct of epichlorohydrin
B - 59 Wt. % Cationic Acrylamide The data indicate that the conventional polymers did not remove too much of the oil but had a larger effect on turbidity reduction. Oil removal, however, is the critical parameter.

EXAMPLE 4
Oil Water Treatment with Hydrophobid Functionalized Polymers

A test similar to Example 3 was run, using three polymers made by the process in Example 1 of this invention. The polymers tested were all synthesized with or without hydrophobe and with the level of hydrolysis shown in the table below, along with the turbidimetric performance data.

| Turbidity (NTU) Remaining After Treatment With Polymer | | | | | | |
|---|---|---|---|---|---|---|
| | Hydro- | | ppm Active Polymer | | | |
| Polymer | phobe | Hydrolysis | 0.0 | 0.5 | 1.0 | 2.0 | 5.0 |
| A | None | 0% | 285 | 300 | 295 | 290 | |
| B | 1% n-$C_8$ | 0% | 335 | 325 | 315 | | 310 |
| C | 1% n-$C_8$ | 18% | 285 | 290 | 275 | | |

The data indicate that all three of the above polymers are not effective in the removal of oil from the simulated waste water alone. Polymer A is similar to a commercial nonionic polyacrylamide. We have learned by zeta potential measurement that the surface charge on the emulsion used in this test is highly negative. This data indicates that the interaction between the hydrophobic functionality on the water soluble polymers and the oil droplets is much weaker than the electrostatic interactions causing the stability of the oil droplets. As nonionic polymer is added to the emulsion, nothing occurs. As anionic polymer (C) is added, the negative droplets become more stable. This Example suggests the criticality of controlling droplet charge prior to use of hydrophobically functionalized polymers.

EXAMPLE 5
Oily Water Treatment with Hydrophobically Functionalized Nonionic Polymers A test similar to Example 4 was run, using hydrophobically functionalized RAM polymers made by the process of Example 1 of this invention. Based on the data in Example 3 and oil droplet zeta potential information, enough epichlorohydrin cationic polymer was added (0.75 ppm active) at the start of the 150 to 160 rpm mixing time to cause the droplet charge to be neutralized and become somewhat positive. After 10 minutes the polymers of this invention were added (referred to as "ppm active polymer" in the table below) and the mixing was continued at 150 to 160 rpm for an additional 20 minutes. The mixing rate was then reduced to 10 rpm. The method described in Example 4 was then followed. The polymers tested were all synthesized using various levels of hydrophobic monomer as is shown in the table below. Also presented is the performance in terms of the amount of oil remaining in the water after treatment. These RAM polymers were essentially nonionic.

| ppm Oil After Treatment with 0.75 ppm Epichlorohydrin and Hydrophobically Functionalized Nonionic RAM Polymer (Starting Oil = 472 ppm) | | | | | | | |
|---|---|---|---|---|---|---|---|
| | | ppm Active Polymer | | | | | |
| Polymer | Hydrophobe | 0.0 | 0.2 | 0.4 | 0.6 | 0.8 | 1.0 |
| A | None | 451 | 401 | 404 | 430 | 407 | 420 |
| B | 0.75% n-$C_8$ | 451 | 140 | 73 | 59 | 64 | 75 |
| C | 1.0% n-$C_8$ | 451 | 89 | 23 | 26 | 24 | 35 |

The data clearly show the oily water treatment benefit of providing a low mole percent of hydrophobic functionalization to water soluble polymers with n-octylacrylamide, n-$C_8$ (polymers B and C) compared to a polymer made by the same process, but without the n-$C_8$AM addition. The data also show that the polymer with 1.0 mole percent n-$C_8$AM addition results in better performance than the polymer with 0.75 mole percent n-$C_8$AM addition. In conjunction with the data of Example 4, this data illustrates the criticality of using a two polymer system in which treatment with the hydrophobically functionalized polymer is preceded by treatment with a cationic polymer.

EXAMPLE 6

Oily Water Treatment with Hydrophobically Functionalized Anionic HRAM Polymers

A test similar to that described in Example 5 was run using 0.5 ppm active epichlorohydrin and polymers synthesized according to Example 1 having various levels of hydrophobic monomer and about an 18 mole percent hydrolysis level. This is shown in the table below, along with the performance data presented in terms of the amount of oil remaining in the water after treatment.

| | | ppm Oil After Treatment With 0.5 ppm Epipolyamine Adduct of Epichlorohydrin and Hydrophobically Functionalized Anionic HRAM Polymer (Starting Oil = 446 ppm) | | | | | | |
|---|---|---|---|---|---|---|---|---|
| | Hydro- | ppm Active Polymer | | | | | | |
| Polymer | phobe | 0.0 | 0.25 | 0.5 | 0.75 | 1.0 | 1.25 | 1.5 |
| A | None | 440 | 104 | 98 | 91 | 98 | 117 | 119 |
| B | 1% n-$C_8$ | 440 | 239 | 86 | 64 | 50 | 55 | 79 |

The data show that, while conventional an ionic polyacrylamide type polymers, A, are capable of some oil removal when used in combination with cationic polymers, such as the current epipolyamine adduct of epichlorohydrin, the hydrophobic functionalization of the polymers, such as polymer B, provides a significant enhancement in oil removal performance.

EXAMPLE 7

Oily Water Treatment with Hydrophobically Functionalized Polymers

A test similar to that described in Example 5 was run using 1.0 ppm active epichlorohydrin and polymers synthesized according to Example 1 having various levels of hydrophobic monomer and about an 18 mole percent hydrolysis level. This is shown in the table below. The performance data is presented in terms of the amount of oil remaining in the water after treatment.

| | | ppm Oil After Treatment With 1.0 ppm Epipolyamine Adduct of Epichlorohydrin and Functionalized Polymer (Starting Oil = 444 ppm) | | | | | | |
|---|---|---|---|---|---|---|---|---|
| | Hydro- | ppm Active Polymer | | | | | | |
| Polymer | phobe | 0.0 | 0.5 | 1.0 | 1.5 | 1.75 | 2.0 | 2.5 |
| A | None | 419 | 426 | 409 | 98 | | 243 | 306 |
| B | 1% n-$C_8$ | 419 | 405 | 239 | 71 | 67 | 35 | 54 |

The data indicate that the addition of an hydrophobically functionalized polymer after treatment with a cationic polymer significantly improves the process of oil removal from waste waters. This data also indicates the need for a higher treatment level of anionic polymer, either functionalized (B) or not (A), to achieve the maximum oil removal possible with each polymer as compared to Example 6 (where less epichlorohydrin polymer was used). This is due to the fact that more cationic polymer addition results in over charge neutralization of the oil droplets and highly positive oil droplets, which must be neutralized from the opposite direction before hydrophobic interaction between droplet and polymer can take place.

EXAMPLE 8

Oily Water Treatment with Lower Molecular Hydrophobically Functionalized Polymers A test similar to that described in Example 5 was run using 0.75 ppm active epipolyamine adduct of epichlorohydrin and polymers synthesized according to Example 1 using 1 mole percent of hydrophobic monomer, with and without about 18 mole percent hydrolysis. Before use, 2,000 ppm solutions of polymer were treated at high energy with a sonic probe at room temperature for 5 minutes to lower molecular weight. The performance data is presented below in terms of the amount of oil remaining in the water after treatment.

| | | ppm Oil After Treatment With 0.75 ppm Epipolyamine Adduct of Epichlorohydrin and Functionalized Polymer (Starting Oil = 468 ppm) | | | | | | |
|---|---|---|---|---|---|---|---|---|
| | Hydrol- | ppm Active Polymer | | | | | | |
| Polymer | ysis | 0.0 | 0.2 | 0.4 | 0.6 | 0.8 | 1.0 | 1.2 |
| A | 0% | 454 | 135 | 72 | 44 | 43 | 120 | 111 |
| B | 18% | 454 | 408 | 148 | 85 | 83 | 121 | 90 |

The data indicate that lower molecular weight polymers than those prepared in Example 1 synthesis conditions also are effective in reducing oil in waste waters.

EXAMPLE 9

Oily Water Treatment with DMDAAC and Hydrophobically Functionalized Polymers

A test similar to that described in Example 5 was run using 0.4 ppm active polydimethyldiallyl ammonium chloride (DMDAAC) cationic homopolymer in place of the epipolyamine adduct of epichlorohydrin and polymers synthesized according to Example 1 using various levels of hydrophobic monomer and no hydrolysis. As is shown in the table below, the performance data is presented in terms of the amount of oil remaining in the water after treatment.

| | | ppm Oil After Treatment With 0.4 ppm DMDAAC and Functionalized Polymer (Starting Oil = 428 ppm) | | | | | | |
|---|---|---|---|---|---|---|---|---|
| | Hydro- | ppm Active Polymer | | | | | | |
| Polymer | phobe | 0.0 | 0.1 | 0.2 | 0.4 | 0.6 | 0.8 | 1.0 |
| A | None | 379 | | 372 | 378 | 375 | 37 | 390 |
| B | 1% n-$C_8$ | 379 | 74 | 43 | 51 | 79 | 136 | 154 |

The data show that the disclosed oily water treating process works with more than one type of cationic polymer; namely, polydimethyldiallylammonium chloride, DMDAAC.

EXAMPLE 10

Oily Water Treatment with Hydrophobically Functionalized Polymers

A test similar to that described in Example 5 was run using 1.5 ppm of a commercially available cationic polyacrylamide containing about 30 mole percent of cationic charge in place of the epichlorohydrin and polymers synthesized according to Example 1, using various levels of hydrophobic monomer as is shown in the table below. Polymers A and B are nonionic, while polymer C contains about 18 mole percent sodium acrylate groups. The performance data is presented in terms of the amount of oil remaining in the water after treatment.

| ppm Oil After Treatment with 1.5 ppm Cationic Acrylamide and Functionalized Polymer (Starting Oil = 502 ppm) | | | | | | | |
|---|---|---|---|---|---|---|---|
| Polymer | Hydro-phobe | ppm Active Polymer | | | | | |
| | | 0.0 | 0.25 | 0.5 | 0.75 | 1.0 | 1.5 | 2.0 |
| A | None | 438 | 426 | 410 | 381 | 367 | 302 | 188 |
| B | 1% n-C$_8$ | 438 | 249 | 39 | 15 | 15 | 16 | 29 |
| C | 1% n-C$_8$ | 438 | | 13 | 13 | 16 | 22 | |

The data, in combination with the previous Examples, show that the disclosed oily water treating process works with several types of cationic polymer.

EXAMPLE 11

Oily Water Treatment with Hydrophobically Functionalized Polymers

A test similar to that described in Example 5 was run using 0.75 ppm active epipolyamine adduct of epichlorohydrin and polymers synthesized according to Example 1 using various levels of hydrophobic monomer. Polymer B and C have about 30 mole percent of the acrylamide substituted by N-vinylpyrrolidone, NVP, and no hydrolysis. As is shown in the table below, the performance data is presented in terms of the amount of oil remaining in the water after treatment.

| ppm Oil After Treatment with 0.75 ppm Epipolyamine Adduct of Epichlorohydrin and Functionalized Polymer (starting oil = 508 ppm) | | | | | | | |
|---|---|---|---|---|---|---|---|
| Polymer | Hydro-phobe | ppm Active Polymer | | | | | |
| | | 0.0 | 0.2 | 0.4 | 0.6 | 0.8 | 1.0 | 1.2 |
| A | 1% n-C$_8$ | 485 | 95 | 44 | 31 | 51 | 90 | 127 |
| B | 1% n-C$_8$ | 485 | 202 | 76 | 61 | 68 | 137 | 144 |
| C | 1.25% n-C$_8$ | 485 | 188 | 73 | 53 | 78 | 89 | 125 |

The data indicate that the acrylamide backbone may be significantly replaced with other water soluble monomers and result in polymers that still exhibit the novel treatment effect of this invention compared to polymers that do not contain the novel hydrophobic functionalization.

EXAMPLE 12

Oily Water Treatment with Hydrophobically Functionalized Polymers

A test similar to that described in Example 5 was run using a Bakersfield crude oil in place of the Cody crude oil described in Example 2. The resulting test emulsion had the following properties:
Turbidity: 160 to 190 NTU
Oil Content: 160 to 190 mg/l
pH: 8.0 (adjusted)

Initial treatment was with 0.5 ppm active epipolyamine adduct of epichlorohydrin, followed by treatment with polymers synthesized according to Example 1 using various levels of hydrophobic monomer as is shown in the table below. The performance data is presented in terms of the amount of oil remaining in the water after treatment.

| ppm Oil After Treatment with 0.5 ppm Epipolyamine Adduct of Epichlorohydrin and Functionalized Polymer (Starting Oil = 446 ppm) | | | | | |
|---|---|---|---|---|---|
| Polymer | Hydro-phobe | ppm Active Polymer | | | |
| | | 0.0 | 0.05 | 0.1 | 0.2 | 0.4 |
| A | None | 160 | 167 | 163 | 171 | 164 |
| B | 1% n-C$_8$ | 160 | 59 | 144 | 144 | 158 |

The data show that the oily water treatment process of this invention is effective in resolving other crude oil emulsions.

EXAMPLE 13

Oily Water Treatment with Hydrophobic Functionalized Polymers

A test similar to that described in Example 5 was run using 0.5 ppm active epipolyamine adduct of epichlorohydrin and 0.5 ppm of a polymer synthesized according to Example 1 using 1 mole percent of hydrophobic monomer and without hydrolysis. The effects of the cationic polymer-hydrophobic polymer order of addition were studied. The performance data is presented below in terms of the amount of turbidity (NTU) remaining in the water after treatment.

| Turbidity (NTU) After Treatment With 0.5 ppm Epipolyamine Adduct of Epichlorohydrin and 0.5 ppm Functionalized Polymer (Starting Turbidity = 315 NTU) | |
|---|---|
| Order of Addition | NTU |
| Hydrophobically Functionalized Polymer First | 81 |
| Simultaneous Polymer Addition | 57 |
| Cationic Polymer First | 14 |

The data indicate the criticality of the order of addition of polymer to the simulated waste water. One cannot simply add polymer to the waste water and expect to achieve an additive effect. The hydrophobically functionalized polymers used in the process of this invention are best added after the surface charge of the oil droplets has been reduced and perhaps made positive using a cationic additive.

What is claimed is:

1. A method of breaking oil-in-water emulsions or the clean-up of oily waste water which comprises the steps of:
   a. treating the emulsion or waste water stream with an ionic chemical under suitable agitation conditions to neutralize the charge on the oil droplets, wherein said ionic chemical is a cationic polymer selected from the group consisting of melamine-formaldehyde resin, polyepichlorohydrins, poly-3-methacrylamidopropyltrimethylammonium chloride and copolymers with acrylamide, poly-2-methacrylatoethyltrimethylammonium chloride and copolymers with acrylamide, and diallyl dimethylammonium chloride and copolymers with acrylamide;
   b. adding a water soluble or water dispersible hydrophobically functionalized copolymer comprising a water soluble portion and an oil soluble or hydrophobic portion under suitable agitation conditions to form particles; wherein the hydrophobically functionalized copolymer comprises 0.1 to 10 mole percent of a hydrophobic monomer elected from the group consisting of alkylacrylamide and alkyl(meth) acrylate with an alkyl group of from 4 to 20 carbon atoms and 90 to 99.9 mole percent of a water soluble monomer selected from the group consisting of acrylic acid and salts of acrylic acid.

c. allowing sufficient time for the particles to separate by gravity or by accelerated means.

2. A method of breaking oil-in-water emulsions or the clean-up of oily waste water which comprises the steps of:

a. treating the emulsion or waste water stream with a cationic chemical under suitable agitation conditions, wherein said cationic chemical is a cationic polymer is selected from the group consisting of melamine-formaldehyde resins, polyepichlorohydrins, poly-3-methacrylatoethylotrimethylammonium chloride and copolymers with acrylamide, and diallyl dimethylammonium chloride and copolymers with acrylamide;

b. adding a water soluble or water dispersible hydrophobically functionalized terpolymer comprising a nonionic water soluble portion, an anionic water soluble portion and an oil soluble or hydrophobic portion under suitable agitation conditions to form particles; wherein the hydrophobically functionalized terpolymer comprises 0.1 to 10 mole percent of a hydrophobic monomer selected from the group consisting of alkylacrylamide and alkyl(meth) acrylate with an alkyl group of from 4 to 20 carbon atoms, 5 to 40 mole percent of a salt of an acrylic acid or methacrylic acid, and 50 to 94.9 mole percent of a water soluble acrylamide monomer.

c. allowing sufficient time for the particles to separate by gravity or by accelerated means.

* * * * *